United States Patent
Burnham et al.

(10) Patent No.: US 7,039,817 B2
(45) Date of Patent: May 2, 2006

(54) METHOD AND APPARATUS FOR SUPPLYING POWER TO A PROCESSOR AT A CONTROLLED VOLTAGE

(75) Inventors: Andrew S. Burnham, Leatherhead (GB); Paul Garnett, Camberley (GB); J. Rothe Kinnard, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 490 days.

(21) Appl. No.: 10/337,619

(22) Filed: Jan. 7, 2003

(65) Prior Publication Data
US 2004/0133813 A1 Jul. 8, 2004

(51) Int. Cl.
*G06F 1/32* (2006.01)
(52) U.S. Cl. ...................................................... 713/320
(58) Field of Classification Search .................. None
See application file for complete search history.

(56) References Cited

U.S. PATENT DOCUMENTS

| | | | |
|---|---|---|---|
| 5,781,788 A * | 7/1998 | Woo et al. ...................... 712/1 |
| 6,035,407 A * | 3/2000 | Gebara et al. ............... 713/300 |
| 6,680,604 B1 * | 1/2004 | Muratov et al. ............ 323/285 |
| 6,697,952 B1 * | 2/2004 | King .......................... 713/300 |
| 6,772,356 B1 * | 8/2004 | Qureshi et al. ............. 713/321 |
| 6,795,927 B1 | 9/2004 | Altmejd et al. |
| 6,823,465 B1 * | 11/2004 | Zhang ......................... 713/300 |
| 6,845,456 B1 | 1/2005 | Menezes et al. |
| 6,885,233 B1 * | 4/2005 | Huard et al. ................ 327/513 |

OTHER PUBLICATIONS

"Mobile Pentium™ II Power Supply Evaluation Board", International Rectifier, El Segundo, CA, 1998, pp. 1-4.
"Dual Step-Down Controllers Plus Linear-Regulator Controller for Notebook Compuers", Maxim Integrated Products, Sunnyvale, CA, Oct. 2002, pp. 1-49.

* cited by examiner

*Primary Examiner*—Lynne H. Browne
*Assistant Examiner*—Anand B. Patel
(74) *Attorney, Agent, or Firm*—Myertons Hood Kivlin Kowert & Goetzel, P.C.; B. Noël Kivlin

(57) ABSTRACT

Apparatus forming a computer system or such-like is disclosed that includes a central processing unit (CPU) and a power supply unit. The CPU provides a digital voltage ID (VID) signal output indicative of the power supply voltage that it desires to receive. The power supply unit has a control input for receiving a digital VID signal from the CPU. The power output from the unit is then provided to the CPU at a voltage level in accordance with the received digital VID signal. A VID offset generator is interposed between the CPU and the power supply unit. This receives the digital VID signal from the CPU, and modifies it by applying a positive or negative offset. The modified digital VID signal is then passed to the power supply unit, which supplies a voltage to the CPU as per the modified VID signal, rather than the VID signal originally output by the CPU.

26 Claims, 5 Drawing Sheets

METHOD AND APPARATUS FOR SUPPLYING POWER TO A PROCESSOR AT A CONTROLLED VOLTAGE

FIELD OF THE INVENTION

The present invention relates to the supply of power to a processor, and in particular to controlling the voltage of this supply.

BACKGROUND OF THE INVENTION

FIG. 1 illustrates the configuration of the power supply to a central processing unit (CPU) in a typical computer system. The system receives an AC power supply from the mains or other appropriate source, which is passed into an AC/DC converter 101. This outputs a moderate DC voltage, typically about 12 volts, in order to power the various components within the computer system, for example the hard disk drive, input/output devices, and so on.

Frequently however, the CPU 103 requires a somewhat lower voltage than that provided by the AC/DC converter 101. Therefore, a DC/DC converter 102 is interposed between the AC/DC converter 101 and CPU 103. This DC/DC converter 102 receives the 12 volt supply from DC/DC converter 102, and outputs a DC supply at a suitably lower voltage (typically about 1.5 volts, depending on the particular CPU 103 in question).

Many modern CPUs provide an output control signal that indicates the particular voltage level that should be supplied to the CPU. The rationale for this is that the optimum supply voltage for a given CPU 103 may vary slightly, depending upon a number of factors. For example, if a particular type of CPU is available in two versions, one with a higher clock speed than the other, then a slightly increased supply voltage may be required for peak performance at the higher clock speed (compared to the supply voltage normally used at the lower clock speed).

It is generally desirable that the motherboard or other circuit incorporating the CPU is able to support both versions of the CPU, despite their slightly different supply voltage requirements. Moreover, it is most convenient if this dual support is provided automatically, rather than having to make hardware modifications to the motherboard in order to change from one CPU version to another. This simplifies inventory management, in that only a single standard motherboard is required to operate with both CPU versions. Furthermore, a potential upgrade path is enabled, whereby the slower CPU version may be replaced with the faster CPU version on a given motherboard.

The control of the CPU supply voltage is accomplished by having a setting within the CPU itself that indicates the optimum voltage supply level for that particular CPU. This setting is then used to generate a digital voltage ID (VID) 105 output signal. The VID signal 105 is passed back to DC/DC converter 102, and used in turn to control the level of power supply voltage provided to the CPU 103.

In one particular embodiment, VID signal 105 is implemented as a five-bit code. The DC/DC converter 102 then contains a look-up table, which maps the various possible five-bit digital VID codes 105 received from the CPU 103 to a corresponding voltage level. The DC/DC converter 102 then provides the CPU 103 with the supply voltage requested by the CPU 103 (i.e. as determined by the VID code 105). It will be appreciated that this allows any CPU 103 to be used with a given DC/DC converter 102, provided that the CPU 103 and DC/DC converter 102 share the same look-up table to transform the VID code into a supply voltage level.

Note that in some systems, the CPU generates two VID signals. The first VID signal is controlled by hardware within the CPU, and is used to determine the supply voltage for the CPU 103 when the system is first powered on. Subsequently, a separate VID signal is used, which is controlled by software running on the CPU. (It will be appreciated that this software-controlled VID is not available at system start-up, when there is not yet software loaded into CPU 103, hence the need for the initial hardware VID signal).

The software-controlled VID allows the CPU to specify its supply voltage in a more sophisticated manner than the hardware VID signal, since the VID signal 105 can be adjusted according to particular parameters affecting the CPU. For example, if the CPU detects that its temperature is rising, then it may adjust the VID code so that its power supply voltage is lowered. Another possibility is that in a mobile computing environment, the CPU may decide to reduce its supply voltage and clock frequency in order to save power, and hence to conserve battery strength. The lowering of supply voltage can be accomplished by the CPU outputting an appropriate (reduced) VID code 105.

The configuration of FIG. 1 is generally satisfactory for normal operation of the CPU 103 and other components of the system. Nevertheless, there can be circumstances when it is desired to take the system deliberately slightly outside its standard operating regime. One typical reason for wanting to do this is for testing purposes. However, because the CPU in effect controls its own supply voltage via the VID signal, it is difficult to operate the CPU at anything other than the indicated voltage.

SUMMARY OF THE INVENTION

Thus in accordance with one embodiment of the invention there is provided apparatus including a processor such as a central processing unit (CPU). The CPU outputs a digital voltage ID (VID) signal indicative of the power supply voltage that it desires. The apparatus also includes a VID offset generator, which has an input for receiving the digital VID signal from the CPU, and an output for supplying a modified digital VID signal. The modified digital VID signal is determined by applying an offset to the digital VID signal received from the CPU. The apparatus further includes a power supply unit. This has a control input for receiving the modified digital VID signal from the VID offset generator, and a power output for supplying power to the CPU at a voltage level in accordance with the received modified digital VID signal.

Such apparatus therefore provides flexibility as regards the voltage supplied to the CPU, in that this does not have to match exactly the voltage that the CPU requests, but rather can be offset from it. At the same time, compatibility is maintained with existing components, such as CPUs and power supplies, since the modification of the digital VID signal is transparent to them.

In normal operation, the offset applied will generally be zero, in other words, the modified digital VID signal will equal the digital VID signal supplied by the CPU. Accordingly, the CPU is therefore supplied with the voltage that it requests. Nevertheless, the flexibility to depart from this arrangement can be useful in a variety of situations. For example, in mobile devices running on batteries, power conservation may be a significant issue. Such systems may therefore select an offset so as to reduce the power supply voltage level provided to the CPU, in order to reduce the drain on the battery. (As previously mentioned, some CPUs already provide internal support for such power conservation techniques, but this is not always the case). Typically the lowering of the power supply voltage is also accompanied by reducing the clock frequency for the CPU.

A further possibility is that modifications in the digital VID signal are utilized for testing purposes. Thus in one particular embodiment, a variety of offsets in a range of offsets are applied to the digital VID signal. These in turn will cause slight variations in the power and timing of output signals sent from the CPU to other devices in the system. The data from such tests can then be used to confirm that there is the expected margin in the signal acceptance parameters of the other devices.

Another possibility is that a CPU is designed to output a VID signal hard-wired to a particular value. If the speed of the chip is then increased, it may be found that the yield can be improved by supplying the CPU with a higher voltage than that indicated by the (fixed) VID signal. The use of a VID offset generator in these circumstances would therefore allow the CPU to be operated at the maximum yield point.

In some systems, the CPU provides two different digital VID signals, a hardware-generated signal that is provided at start-up (i.e. at power-on or on a reset), and a software-generated digital VID signal is supplied once the CPU is operational. It will be appreciated that in the above context, the digital VID signal modified by the VID offset generator is generally whichever one the power supply is currently using to determine the supply voltage.

In one particular embodiment, a controller is interfaced to the VID offset generator. The controller can then send appropriate commands to the VID offset generator to specify the offset to be applied to the digital VID signal received from the CPU. In general the controller will specify both the magnitude of the offset and also its sign (i.e. whether a positive or negative offset is to be applied).

There are a variety of possible implementations for the VID offset generator. In one embodiment, the VID offset generator comprises a program logic device (PLD). This provides a function to combine a signed offset from the controller with the digital VID signal received from the CPU in order to generate the modified digital VID signal. It is also generally advantageous for the PLD to include logic to avoid overflow or underflow (i.e. wraparound or saturation) when performing this task.

In another embodiment, the VIED offset generator comprises a memory device that stores data representing the set of potential modified digital VID signals. The address for reading these is produced by a combination of the digital VID signal received from the CPU and an offset control signal received from the controller. For example, the low order bits of the address may comprise the digital VID code supplied by the CPU, and the high order bits the offset control signal. The data stored in the memory device is then arranged so that for any given combination of initial digital VID signal and offset, the desired modified digital VID signal is output from the address corresponding to that combination.

It will be appreciated that the use of a memory device in this manner is highly flexible, in that the value of the modified digital VID signal can be customised to each individual possible combination of offset control signal and initial digital VID signal from the CPU. In contrast, if it is desired to used the same logic function for all combinations of offset and initial digital VID signal from the CPU, then a PLD would normally provide a simpler implementation.

Flexibility can be further increased if the memory device is writeable to store a new set of data, e.g. the memory is provided by a programmable read only memory (PROM) or a static random access memory (SRAM). This then allows the data in the memory to be updated, to provide a new set of mappings from the initial digital VID code from the CPU to the modified digital VID code as received by the power supply unit. In one particular embodiment, the memory device is implemented as an SRAM that supports a JTAG interface (corresponding to the IEEE 1149.1 standard). The JTAG interface provides a straightforward mechanism to update the data in the SRAM, without impacting the normal data path between the CPU and the power supply. Alternatively, if the SRAM does not support JTAG itself, then JTAG compatible buffers may be inserted into the path on either side of the SRAM. These act as simple pass-through buffers in normal operation, but their JTAG interface can be used to manipulate the inputs/outputs of the SRAM if required, in order to load a new set of mappings into the SRAM.

Note that rather than combining the offset and the initial digital VID code to determine the read address, this could be based simply on the initial digital VID code. In this approach, the memory device is, in effect, configured to a single offset value, i.e. a given digital VID code from the CPU leads to a predetermined modified VID code, as stored in the memory device. The (fixed) offset could then be controlled by writing a new set of data into the memory device (assuming that it is writeable). Although this approach is less convenient for using a range of offsets (since the entire SRAM must be refreshed for each change of offset), it does have the advantage of requiring only a smaller SRAM. Accordingly, it may be appropriate where changes in offset are expected to be limited, for example, if a particular offset is being employed on a long-term basis in order to operate a CPU at a voltage level that corresponds to the maximum yield point.

In accordance with another embodiment of the invention, there is provided a method of operating apparatus including a central processing unit (CPU) and a power supply unit. The method comprises providing from the CPU a digital voltage ID (VID) signal output. The digital VID signal is indicative of the power supply voltage desired by the CPU. The method further comprises applying an offset to the digital VID signal from the CPU in order to generate a modified digital VID signal, which is then passed to the power supply unit. The power supply unit then supplies power to the CPU at a voltage level in accordance with the modified digital VID signal.

It will be appreciated that the method embodiments of the invention will generally benefit from the same particular features as the apparatus embodiment described above.

In summary therefore, in one particular embodiment an apparatus and method are provided for a computer system or such-like that includes a central processing unit (CPU) and a power supply unit. The CPU provides a digital voltage ID (VID) signal output indicative of the power supply voltage that it desires to receive. The power supply unit has a control input for receiving a digital VID signal from the CPU. The power output from the unit is then provided to the CPU at a voltage level in accordance with the received digital VID signal. A VID offset generator is interposed between the CPU and the power supply unit. This receives the digital VID signal from the CPU, and modifies it by applying a positive or negative offset. The modified digital VID signal is then passed to the power supply unit, which provides a voltage to the CPU as per the modified VID signal, rather than the VID signal originally output by the CPU.

Note that such a power supply control procedure is not limited to use with a CPU, but can also be applied to any microprocessor or other such device that similarly outputs a signal indicative of the power supply voltage that it desires.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 2:
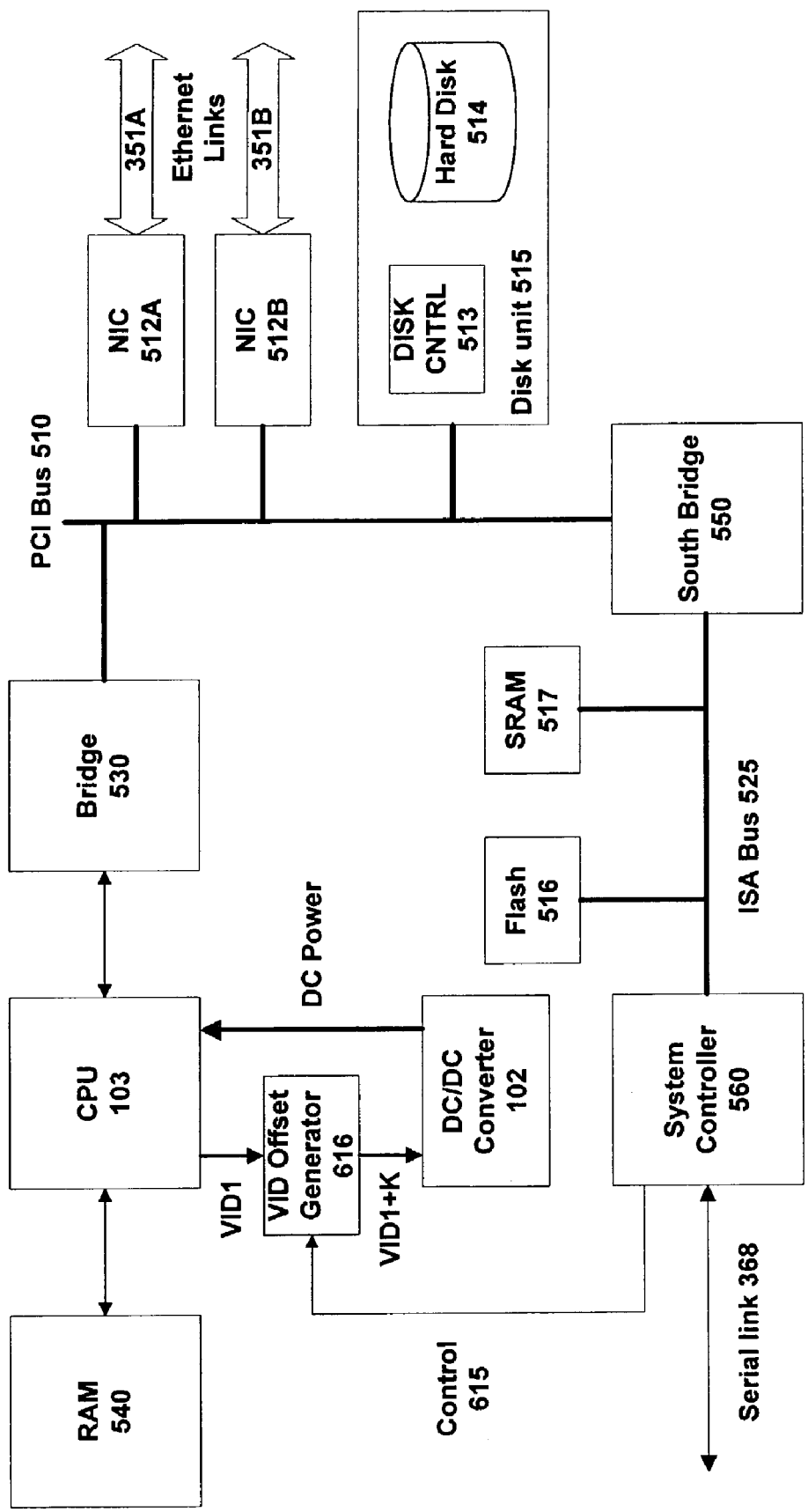
FIG. 2 is an illustration of a system incorporating a CPU power supply configuration in accordance with one embodiment of the invention.

FIG. 2 illustrates in schematic form the configuration of a typical computer system. The particular configuration shown in FIG. 2 corresponds in one embodiment to a processing unit within a rack-mounted server system, in which each shelf can contain multiple independent such processing units. However, it will be appreciated that a broadly similar configuration can also be employed for a stand-alone computer system, for example, in a workstation or desktop computer, as well as in other forms of computing system, e.g., a mainframe, a mid-range system, a laptop, a hand-held computing device, and so on.

At the heart of the configuration shown in FIG. 2 is CPU 103. This is attached to random access memory (RAM) 540 and, via bridge 530, also to a PCI bus 510. Attached to the PCI bus 510 are two network interface cards, 512A, 512B, each attached to a respective Ethernet link 351A, 351B. In addition, a disk unit 515, comprising a disk controller 513 and one or more hard disk drives 514, is also joined to the PCI bus 510.

Further attached to the PCI bus 510 is South Bridge 550. This links to an ISA bus 525, which in turn is connected to flash memory 516, static RAM (SRAM) 517, and system controller 560. The flash memory 516 is used to store the power-on self-test (POST) routines, and also the boot code for the system, while SRAM 517 provides memory to be used during the boot process.

The system controller 560 provides management services for various aspects of the behaviour of the computer system of FIG. 2. These include receiving configuration and other commands over serial link 368 from some external control facility (not shown in FIG. 2), and well as reporting diagnostic and operational information from the system back to such facility.

Also shown in FIG. 2 is DC/DC converter 102. This supplies DC power to the CPU 103, as previously discussed in relation to FIG. 1. (Note that for clarity, the AC/DC converter that supplies power to DC/DC converter 102 has been omitted from FIG. 2). As also discussed in relation to FIG. 1, CPU 103 outputs a voltage ID (VID) signal that indicates its desired supply voltage.

Figure 1:
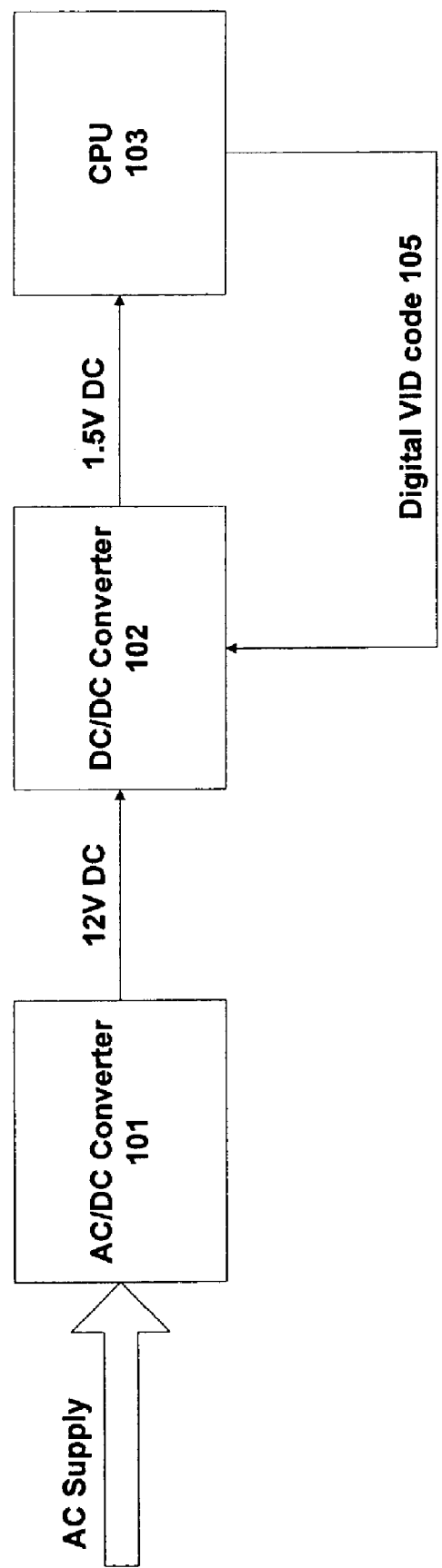
FIG. 1 is an illustration of a CPU power supply configuration in a known system.

However, in contrast to the configuration of FIG. 1, a VID offset generator 616 is now interposed between the CPU 103 and the DC/DC converter 102. The VID offset generator 616 is able to modify the VID signal produced by CPU 103, so that the DC/DC converter receives a different VID code from that originally output by the CPU 103. For example, if the CPU 103 outputs a VID code represented by VID1, then the VID offset generator 616 may output a VID code of VID1+K, where K is a signed selected offset. The DC/DC converter 102 then receives the VID code of VID1+K, and supplies DC power back to the CPU 103 in accordance with this altered VID code (i.e., VID1+K), rather than the VID code that was originally output by the CPU (i.e. VID1).

The amount of offset applied by the VID offset generator 616 is determined by a control signal 615 received from the system controller 560. The control signal specifies whether the value of K is zero or non-zero, and in the latter case, the magnitude of K, along with its sign (i.e. whether a positive or negative offset is to be applied). It will be appreciated that for normal operation of the system, the value of K is generally set at zero, so that in this situation, the VID offset generator 615 does not actually alter the VID code as received by the DC/DC converter 102. Rather the modified VID signal received by the DC/DC converter 102 matches that originally output by the CPU 103, and so the CPU 103 receives its expected (i.e. normal) supply voltage. On the other hand, if the system controller 560 selects a non-zero value for K (whether positive or negative), then the CPU is supplied with a voltage that is different from the voltage that it requested.

There can be a variety of reasons for wanting to alter the power supply voltage received by the CPU. Thus for a standard CMOS device, reducing the supply voltage from its normal setting will generally result in slower switching operation of the CPU, whereas increasing the supply voltage will usually speed up the switching operation of the CPU. Note that this slowing down and speeding up does not refer to the clock speed of the CPU. Rather, it indicates when switching occurs within a given clock cycle. Thus at a higher voltage, switching operations will tend to complete somewhat earlier in a clock cycle, whereas at a lower voltage they will tend to be delayed, and so occur later in the clock cycle. (We are assuming here that the voltage does not become so low that switching operations do not complete at all within the relevant clock cycle, since this will clearly lead to an overall processing failure by the CPU).

The ability to adjust the timing of the CPU is valuable in testing. For example, a system may be designed so that a device accepts a signal from the CPU provided that the signal is received within a predetermined timing window. Adjusting the timing of signals from the CPU then allows the existence and size of this window to be confirmed (a process known as margining).

Another reason for operating a CPU at other than its nominal (i.e. requested) voltage level is to save energy in a mobile environment, where the system is being driven from a battery having limited power capacity. As previously discussed, some CPUs that are specifically designed for such an environment may themselves request lower power in appropriate circumstances (i.e. they output a modified VID code), but not all CPUs have this feature. The presence of VID offset generator 616 therefore allows the power supplied to the CPU to be reduced if appropriate, even if the CPU itself does not incorporate any relevant power management functionality.

Note that such voltage reduction will typically be accompanied by also operating the CPU at a lower clock speed.

Such a descrease in clock speed not only conserves power in its own right, but also helps to avoid any problems with slower switching of the CPU caused by the reduced power supply voltage.

In contrast, it may sometimes be desired to increase the voltage supplied to a CPU from that specified by the VID code. For example, in some CPU ranges, there may be a hard-wired VID output across multiple processor speeds. However, it may be that at certain speeds (particularly the higher ones), the yield of the CPU is improved if the CPU is operated at a somewhat higher voltage than that indicated by the (fixed) VID code. In this case, the VID offset generator can be employed to provide what is in effect a permanent shift to the voltage supplied to the CPU, so that it is placed at its maximum yield point.

Figure 3:
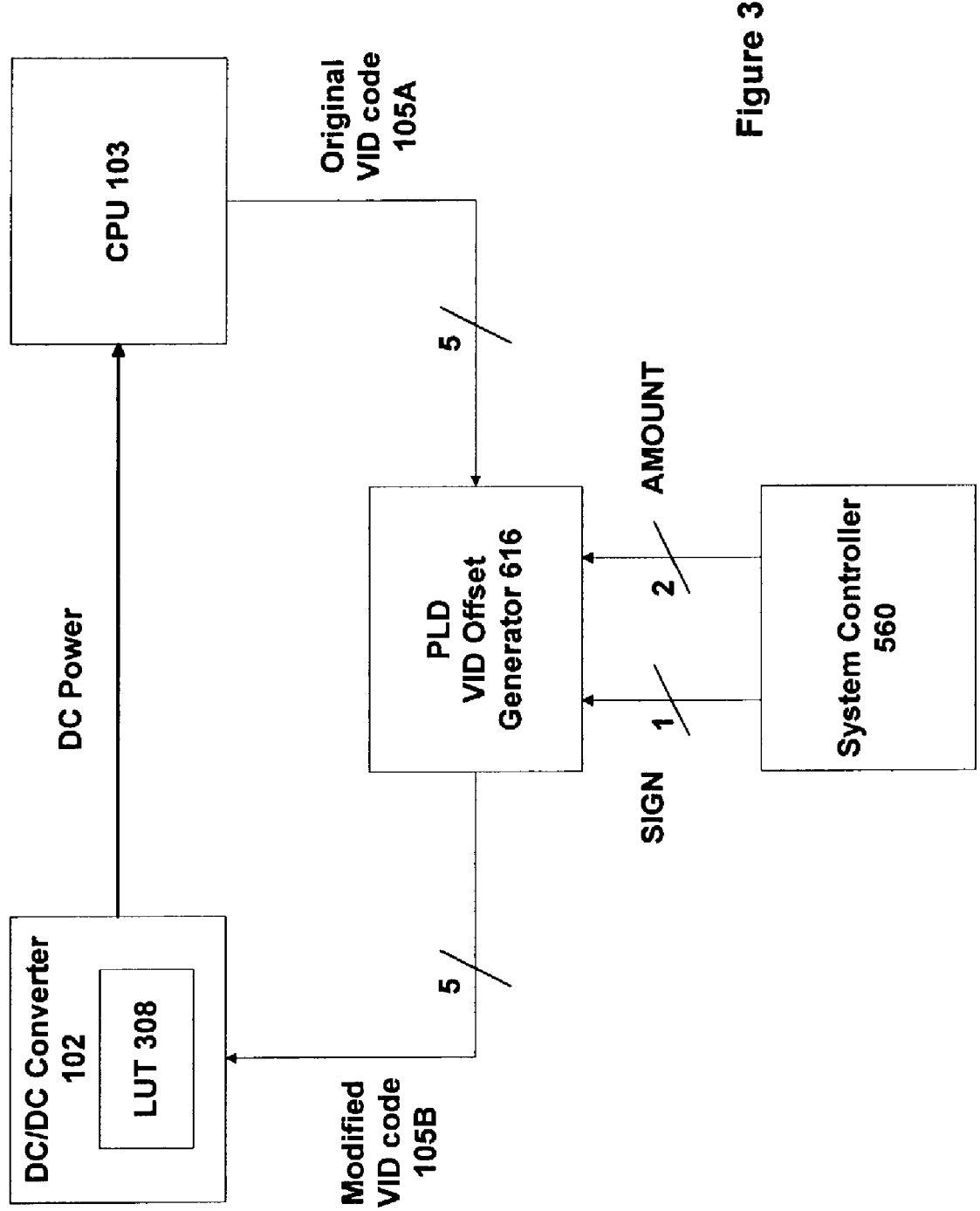
FIG. 3 depicts a CPU power supply configuration in accordance with one embodiment of the invention.
Figure 4:
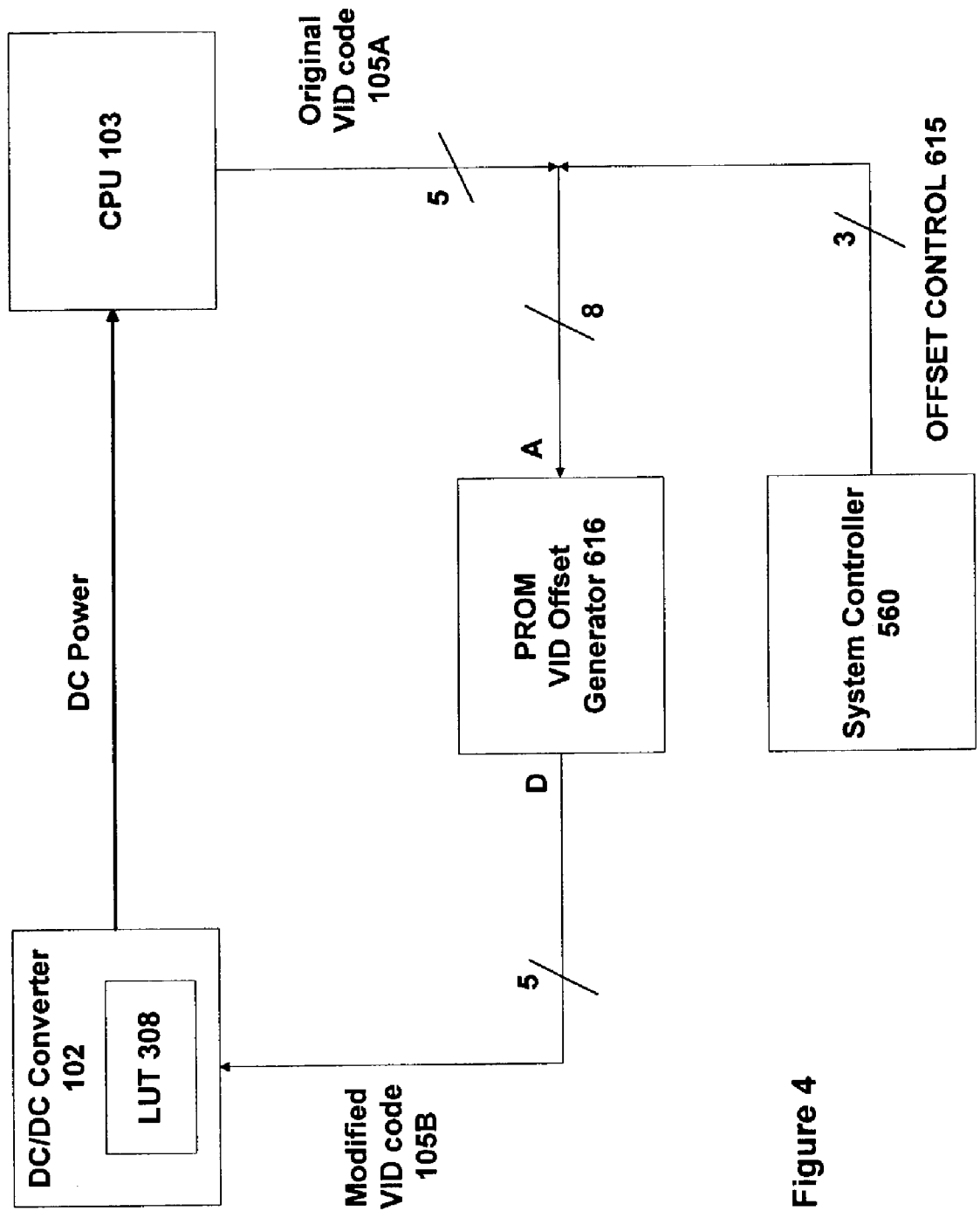
FIG. 4 depicts a CPU power supply configuration in accordance with another embodiment of the invention.
Figure 5:
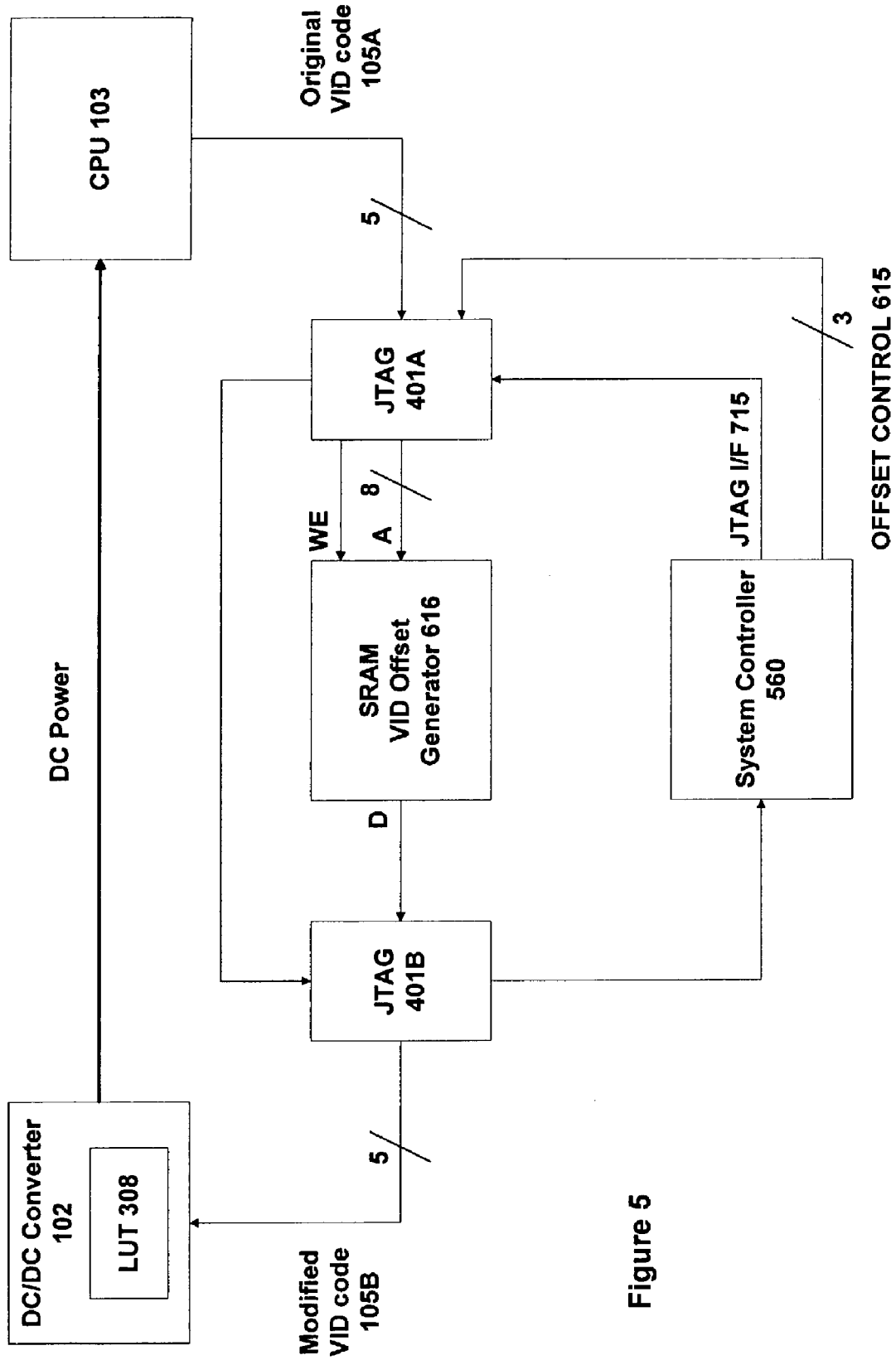
FIG. 5 depicts a CPU power supply configuration in accordance with yet another embodiment of the invention.

FIGS. 3–5 illustrate the configuration of DC/DC converter 102, CPU 103, VID offset generator 616 and system controller 560 according to various embodiments of the invention. Note that for clarity, additional components such as illustrated in FIG. 2 have been omitted.

As previously described, CPU 103 outputs an initial VID code 105A. In one particular embodiment, the CPU is an Athlon XP processor from AMD Corporation, which outputs a five-bit VID signal, where each VID code corresponds to a different desired voltage. An example of a possibly voltage mapping for a 5-bit VID code is illustrated in Table 1. This mapping represents a simple linear relationship, but it will be appreciated that a log-linear mapping may be used, or any other suitable form of relationship. Likewise, in other embodiments, the VID code may have a different number of bits (not necessarily five).

TABLE 1

Mapping of VID code to Voltage

| VID | Volts |
|---|---|
| 00000 | 1.000 |
| 00001 | 1.025 |
| 00010 | 1.050 |
| 00011 | 1.075 |
| 00100 | 1.100 |
| 00101 | 1.125 |
| 00110 | 1.150 |
| 00111 | 1.175 |
| 01000 | 1.200 |
| 01001 | 1.225 |
| 01010 | 1.250 |
| 01011 | 1.275 |
| 01100 | 1.300 |
| 01101 | 1.325 |
| 01110 | 1.350 |
| 01111 | 1.375 |
| 10000 | 1.400 |
| 10001 | 1.425 |
| 10010 | 1.450 |
| 10011 | 1.475 |
| 10100 | 1.500 |
| 10101 | 1.525 |
| 10110 | 1.550 |
| 10111 | 1.575 |
| 11000 | 1.600 |
| 11001 | 1.625 |
| 11010 | 1.650 |
| 11011 | 1.675 |
| 11100 | 1.700 |
| 11101 | 1.725 |
| 11110 | 1.750 |
| 11111 | 1.775 |

Note also that as previously indicated, some CPUs output two VID codes, a first hardware-controlled VID code to be used at power-on or reset, and subsequently a software-controlled VID code. However, since these two VI codes are not simultaneously active, VID code 105A in FIGS. 3–5 simply represents whichever of the two VID codes is currently active—in other words, the hardware VID code at power-on, and the software VID code subsequently.

As described above in relation to FIG. 2, the initial VID code 105A from the CPU 103 is passed through the VID offset generator 616 to produce a modified VID code 105B, which is then received by the DC/DC converter 102 and used to determine the voltage to supply back to CPU 103. More particularly, the DC/DC converter 102 includes a look-up table (LUT) 308, which stores a mapping such as that provided in Table 1. The LUT 308 specifies the supply voltage to be output for any given VID signal received by DC/DC converter 102.

In the embodiment illustrated in FIG. 3, VID offset generator 616 is implemented by a program logic device (PLD), which is under the control of the system controller 560. Thus the system controller sends two signals to the PLD 616. The first of these (SIGN) comprises a one-bit signal representing the sign of the offset (i.e. whether a positive or negative offset should be used), while the second (AMOUNT) is a two-bit signal representing the magnitude of the offset. (It will be appreciated that these two signals could be supplied in combination as a single, three-bit signed offset). Note that if AMOUNT is set to zero, then the original VID code 105A is not modified by the PLD 616, in other words, the modified VID code 105B equals the original VID code 105A.

In the embodiment of FIG. 3, the PLD 616 implements the following logic:

$$NEWVID=OLDVID+OFFSET \qquad \text{(Equation 1)}$$

where OLDVID corresponds to the original VID signal 105A from the CPU, NEWVID corresponds to the modified VID signal 105B, and OFFSET is determined by treating the SIGN and AMOUNT control signals together as a three-bit signed offset. For example, if OLDVID=13, AMOUNT=2, and SIGN=1, where we regard 0 as down (i.e. a negative offset) and 1 as up (i.e. a positive offset), then NEWVID=15. In the case of the mapping of Table 1, this would then lead to an increase in the supplied voltage from 1.325V to 1.375V.

It will be appreciated that PLD 616 may implement a more sophisticated algorithm than that of Equation 1. For example, the value of AMOUNT could be squared before adding/subtracting from the original VID code 105A.

As another example, consider a log-linear mapping in a 32-bit VID range extending between 1 and 2 Volts. In this case, an offset of 2 VID codes corresponds roughly to a relative change in voltage of 4%, which is typically the size required for testing purposes.

One slight complication is that care should be taken to avoid overflow or underflow (wraparound) of the original VID code 105A, particularly if the original VID code is near the limits of its range. This can be ensured by using standard dead-end techniques in the offset process. Alternatively, the original VID code 105A may be fed to the system controller, as well as to PLD 616. This then allows the system controller 560 itself to perform the necessary checking, in order to ensure that it does not select an offset that will cause wraparound.

FIG. 4 illustrates an alternative embodiment, where this time VID offset generator 616 is implemented using a look-up table. In this embodiment, the VID offset generator 616 typically comprises a programmable read-only memory (PROM), or a similar form of device (rather than a PLD).

In order to specify the offset in the configuration of FIG. 4, the system controller outputs a 3-bit OFFSET CONTROL signal 615. This can be regarded as analogous to the combination of the SIGN and AMOUNT signals in FIG. 2 (although as will become apparent, it is somewhat more flexible). This OFFSET CONTROL signal 615 is then combined with the initial 5-bit VID code 105A from CPU 103 to generate an 8-bit address signal. The resulting 8-bit address signal is then used to access a (five-bit) data value stored in PROM 616, wherein the accessed data value corresponds to the modified VID code 105B to be output to DC/DC converter 102.

Typically the OFFSET signal forms the three low order bits of the address signal, with the original VID code 105A forming the five high order bits. This then has the effect of allowing the data in PROM 616 to be easily represented as a separate set of mappings for each VID code, although it will be appreciated that any other suitable form of combination can be used.

The use of a 3-bit OFFSET CONTROL allows 8 possible outputs to be specified for each original VID code 105A. Note that these outputs can be chosen as desired, for example, four outputs may represent positive offsets from the original VID code 105A, and three may represent negative offsets (one of the 8 outputs will normally correspond to zero offset, in other words, where the modified VID code 105B equals the original VID code 105A). Moreover the resulting offsets do not have to be the same for all values of the original VID code 105A. For example, if the VID signal is near its maximum value, then most of the modified outputs could represent negative offsets. (Note that since the output values are stored in PROM 616, as opposed to being calculated in a PLD, there is no risk of overflow or underflow).

Table 2 provides an illustration of a mapping from the original VID code 105A (OLDVID) and OFFSET CONTROL 615 to the modified VID code 105B (NEWVID), such as may be stored in PROM 616. Note that only a portion of the mapping is shown, for two particular values of OLDVID. Note also that only the two DATA columns are actually stored in PROM 616 itself—the two columns forming the ADDRESS represent the two inputs signals (OFFSET 615 and original VID code 105A) that in combination specify the address used to read the DATA from the PROM 616. Again, it is assumed that a 5-bit VID code and a 3-bit OFFSET CONTROL are used to specify the modified VID signal 105B, but it will be appreciated that other embodiments may again have different bit lengths for these signals.

Table 2 illustrates some of the flexibility of the PROM approach. Thus for one of the original VID codes (10001) shown in Table 2, four of the OFFSETs lead to an increased VID code, whereas for the other original VID code (10010), four of the OFFSET lead to a decreased VID code. Note also that the step size for the increase/decrease of the VID code does not have to be uniform with respect to a changing OFFSET CONTROL signal 615. Thus PROM 616 can be used to store any desired mapping from the original VID code 105A (OLDVID) to the modified VID code 105B (NEWVID), as dependent upon the supplied OFFSET CONTROL signal 615.

TABLE 2

Mapping of OLDVID + OFFSET to NEWVID

| ADDRESS | | DATA |
|---|---|---|
| OLDVID | OFFSET | NEWVID |
| 10001 | 000 | 10001 |
| 10001 | 001 | 10010 |
| 10001 | 010 | 10011 |
| 10001 | 011 | 10100 |
| 10001 | 100 | 10110 |
| 10001 | 101 | 10000 |
| 10001 | 110 | 01111 |
| 10001 | 111 | 01101 |
| 10010 | 000 | 10010 |
| 10010 | 001 | 10011 |
| 10010 | 010 | 10100 |
| 10010 | 011 | 10110 |
| 10010 | 100 | 10001 |
| 10010 | 101 | 10000 |
| 10010 | 110 | 01111 |
| 10010 | 111 | 01101 |

In deciding whether to adopt the implementation of FIG. 3 or FIG. 4, it will be appreciated that if a fairly straightforward mapping is desired between the original VID code 105A and the modified VID code 105B (such as that given by Equation 1 above), then a PLD will typically provide a relatively simple solution. On the other hand, for more complicated mappings, use of a PROM provides a convenient solution, although it would of course be possible to construct a PLD to correspond to any desired mapping (however complex).

FIG. 5 illustrates an enhancement of the approach of FIG. 4, whereby the VID offset generator 616 is implemented as a static random access memory (SRAM). The SRAM 616 is used to store a look-up table analogous to that of FIG. 4 and Table 2. Thus as previously described, a 3-bit OFFSET CONTROL signal 615 from the system controller 560 is combined with the 5-bit original VID code 105A to generate an 8-bit address. This address is then used to access the corresponding modified VID code 105B, which is stored as data in SRAM 616, and which can then be output to DC/DC converter 102.

In the embodiment of FIG. 5, it is possible to update SRAM 616 in order to alter the mappings from the original VID code 105A and OFFSET CONTROL signal 615 to the modified VID code 105B. (This represents writing a new set of values into the DATA columns of Table 2). In the particular implementation of FIG. 5, this is achieved by providing JTAG buffers 401A, 401B on the either side of SRAM 616. Note that JTAG is an industry standard, formally referred to as the IEEE Standard Test Access Port and Boundary Scan Architecture (IEEE standard 1149.1). More details about JTAG can be found, for example, on the page /microelectronics/whitepapers/wpr-0018-01/ at the web site www.sun.com.

In normal operation, buffers 401A and 401B are simple pass-through buffers, so that their presence is transparent to the rest of the system.). In this situation, SRAM 616 then operates in substantially the same manner as described above in relation to the PROM of FIG. 4. However, JTAG provides special purpose circuitry at the input/output pins (i.e. boundary) of buffers 401A and 401B to allow specific data to be written into or read from buffers when the JTAG interface 715 is asserted In order to update the mapping data stored in SRAM 616, the system controller 560 asserts the JTAG interface 715.

The system controller 560 can then transmit the mappings (and corresponding address information) over this interface into JTAG bufers 401A and 401B. This in turn allows the revised mapping data to be stored into SRAM 616 by asserting the SRAM Write Enable signal.

It will be appreciated that although the JTAG interface of buffers 401A and 401B provides a convenient mechanism for updating SRAM 616, other approaches may also be adopted for this purpose. For example, a conventional data input could be provided to SRAM 616, thereby allowing the desired set of modified VID codes 105B to be stored into the device. (This would generally require the ability to provide a separate address control signal into SRAM 616, isolated from the original VID code 105A from CPU 103 and OFFSET CONTROL signal 615 from system controller 560). Note also that SRAM 616 may itself support a JTAG interface directly (which would then dispense with the need for buffers 401A and 4011B).

The ability to update the SRAM 616 can be useful if various ranges of offsets are desired. Whether or not this is the case will generally depend on the reason for which the VID code 105A is being modified. For example, different testing procedures may require a different set of offsets, whereas a power management facility may simply have a single set of offsets available.

Another way of viewing the ability to update SRAM 616 is that it allows a smaller OFFSET CONTROL signal to be used, which in turn reduces the size of SRAM 616. Taking this approach to the limit, it is in fact possible to dispense altogether with the OFFSET CONTROL signal, so that there is a fixed mapping from the original VID code 105A to the modified VID code 105B. This mapping can then be arranged to supply zero offset (i.e. the modified VID code 105B equals the original VID code 105A) for normal system operations. However, for testing or other purposes, the SRAM 616 could be updated to store a different mapping, with a non-zero offset as desired. Although eliminating the OFFSET CONTROL signal 615 in this manner does simplify the overall circuit design, refreshing the SRAM 616 is clearly a much slower operation than simply modifying the OFFSET CONTROL signal. Consequently, in general it is likely that OFFSET CONTROL signal 615 will indeed be retained in most embodiments.

Although the approach described herein is typically intended for use in a computer system, it is applicable to any electronic system that includes one or more CPUs. It will be appreciated that this includes a wide variety of computing systems (mainframe, server, workstation, desktop, laptop, handheld, etc.), and special purpose or embedded systems (e.g. telecommunications apparatus, household electronic devices such as televisions and DVDs, electronic subsystems for transport devices such as cars and aeroplanes, and so on).

Similarly, the approach described herein has primarily been explained in the context of the power supply to a CPU. Nevertheless, it will be recognised that the same approach can also be potentially adopted with a wide range of processors, for example, a general purpose microprocessor or application specific integrated circuit (ASIC), or any other analogous device that outputs a signal indicative of the power supply voltage that it desires.

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. An apparatus comprising:
   a processor, said processor outputting a digital voltage ID (VID) signal indicative of the power supply voltage desired by the processor;
   a VID offset generator having an input for receiving the digital VID signal from the processor, and an output for supplying a modified digital VID signal, wherein the modified digital VID signal is determined by applying an offset to the digital VID signal received from the processor, wherein the VID offset generator comprises a memory device that stores data representing a set of modified digital VID signals; and
   a power supply unit having a control input for receiving the modified digital VID signal from the VID offset generator, and a power output for supplying power to the processor at a voltage level in accordance with the received modified digital VID signal.

2. The apparatus of claim 1, further comprising a controller interfaced to the VID offset generator, for determining the offset applied to the digital VID signal received from the processor.

3. The apparatus of claim 2, wherein the controller sends a signal to the VID offset generator specifying the magnitude of the offset to be applied to the digital VID signal received from the processor.

4. The apparatus of claim 2, wherein the controller sends a signal to the VID offset generator specifying the sign of the offset to be applied to the digital VID signal received from the processor.

5. The apparatus of claim 1, wherein the VID offset generator comprises a program logic device (PLD).

6. The apparatus of claim 5, wherein the PLD is operable to add a signed offset received from a controller to the digital VID signal received from the processor in order to determine the modified digital VID signal.

7. The apparatus of claim 6, wherein said PLD includes logic to avoid overflow when determining the modified digital VID signal.

8. The apparatus of claim 1,
   wherein a read address for the memory device is determined by a combination of the digital VID signal received from the processor and an offset control signal received from a controller,
   and wherein the data stored for said read address represents the modified digital VID signal corresponding to said combination of the digital VID signal received from the processor and the offset control signal received from the controller.

9. The apparatus of claim 8, wherein said memory device is writeable to store a new set of data.

10. The apparatus of claim 9, wherein said memory device comprises a static random access memory (SRAM) that supports a JTAG interface.

11. The apparatus of claim 9, wherein said memory device comprises a static random access memory (SRAM) and associated JTAG buffers, wherein said JTAG buffers are used to store a new set of data into the SRAM.

12. The apparatus of claim 1, wherein the VID offset generator supplies a modified digital VID signal leading to a reduced power supply voltage level to the processor in order to permit power conservation.

13. The apparatus of claim 1, wherein the VID offset generator utilizes a range of offsets in order to perform margining of devices attached to the processor.

14. The apparatus of claim 1, wherein the power supply unit includes a look-up table that specifies a power output voltage level for each possible value of the modified digital VID signal.

15. The apparatus of claim 1, wherein the digital VID signal provided by the processor is a hardware-generated signal at start-up and a software-generated signal thereafter.

16. A method of operating apparatus including a processor and a power supply unit, the method comprising:

outputting from the processor a digital voltage ID (VID) signal indicative of the power supply voltage desired by the processor;

applying an offset to the digital VID signal output from the processor to generate a modified digital VID signal, wherein the offset is applied to the digital VID signal by a VID offset generator wherein the VID offset generator comprises a memory device, and the method further comprises storing data representing a set of modified digital VID signals in the memory device;

receiving the modified digital VID signal at the power supply unit; and providing power from the power supply unit to the processor at a voltage level in accordance with the received modified digital VID signal.

17. The method of claim 16, further comprising receiving a control signal at the VID offset generator, said control signal specifying the magnitude and sign of the offset to be applied to the digital VID signal.

18. The method of claim 16, wherein the VID offset generator comprises a program logic device (PLD) that is operable to apply a signed offset received from a controller to the digital VID signal provided by the processor.

19. The method of claim 16, further comprising: combining the digital VID signal received from the processor with an offset control signal received from a controller to generate a read address; outputting the modified digital VID signal stored at said read address to the power supply unit.

20. The method of claim 16, further comprising updating the data stored in the device in order to alter the modified digital VID signals.

21. The method of claim 20, wherein said updating is performed using a JTAG interface for the memory device.

22. The method of claim 16, wherein the modified digital VID signal leads to a reduced power supply voltage level to the processor in order to permit power conservation.

23. The method of claim 16, further comprising utilizing a range of offsets in order to performing margining of devices attached to the processor.

24. The method of claim 16, wherein the power supply unit includes a look-up table that specifies a power output voltage level for each possible value of the modified digital VID signal.

25. The method of claim 16, wherein the digital VID signal provided by the processor is a hardware-generated signal at start-up and a software-generated signal thereafter.

26. An apparatus comprising:

processing means for providing a digital voltage ID (VID) signal output indicative of the power supply voltage desired by the processing means;

means for receiving the digital VID signal from the processing means, and for supplying a modified digital VID signal, wherein the modified digital VID signal is determined by applying an offset to the digital VID signal received from the processing means, wherein the means for receiving the digital VID signal comprises a memory device that stores data representing a set of modified digital VID signals; and means for receiving the modified digital VID signal and for supplying power to the processing means at a voltage level in accordance with the received modified digital VID signal.

* * * * *